(12) United States Patent
Hamlin

(10) Patent No.: US 9,807,949 B2
(45) Date of Patent: Nov. 7, 2017

(54) ROOT ENVIRONMENT CONTROL SYSTEM AND METHOD

(71) Applicant: John W. Hamlin, Port Angeles, WA (US)

(72) Inventor: John W. Hamlin, Port Angeles, WA (US)

(*) Notice: Subject to any disclaimer, the term of this patent is extended or adjusted under 35 U.S.C. 154(b) by 302 days.

(21) Appl. No.: 14/461,010

(22) Filed: Aug. 15, 2014

(65) Prior Publication Data

US 2016/0044879 A1    Feb. 18, 2016

(51) Int. Cl.
| | |
|---|---|
| A01G 31/00 | (2006.01) |
| A01G 9/02 | (2006.01) |
| A01G 31/02 | (2006.01) |
| A01G 27/00 | (2006.01) |

(52) U.S. Cl.
CPC .......... *A01G 31/02* (2013.01); *A01G 27/003* (2013.01); *Y02P 60/216* (2015.11)

(58) Field of Classification Search
USPC .......... 47/62 R, 59 R, 60, 62 A–63, 79, 66.7
See application file for complete search history.

(56) References Cited

U.S. PATENT DOCUMENTS

| | | | |
|---|---|---|---|
| 3,053,011 A | 9/1962 | Silverman | |
| 3,550,319 A * | 12/1970 | Gaines, Jr. ............. | A01G 31/02 422/116 |
| 3,842,535 A | 10/1974 | Lahr | |
| 4,255,896 A | 3/1981 | Carl | |
| 4,332,105 A * | 6/1982 | Nir .......................... | A01G 31/02 137/563 |
| 4,467,561 A | 8/1984 | Tsuchiya | |
| 4,662,106 A * | 5/1987 | Mori ...................... | A01G 7/045 47/17 |
| 4,829,709 A * | 5/1989 | Centafanti ............. | A01G 27/04 47/79 |
| 4,857,464 A | 8/1989 | Weathers et al. | |
| 5,067,275 A | 11/1991 | Constance | |
| 5,675,932 A | 10/1997 | Mauney | |
| 5,860,247 A | 1/1999 | Newby | |
| 7,984,586 B2 | 7/2011 | Brusatore | |
| 8,621,782 B2 | 1/2014 | Buck | |

(Continued)

FOREIGN PATENT DOCUMENTS

WO      WO0057688      2/2000

*Primary Examiner* — Andrea Valenti
(74) *Attorney, Agent, or Firm* — Jacques M. Dulin, Esq.; Innovation Law Group, Ltd.

(57) ABSTRACT

Apparatus system and method of maintaining differential atmospheric control with respect to CO2 and O2 gases in a first, stem/leaf zone, Z-1, of a plant from a second, root zone, Z-2, of the plant. The atmosphere in a stem/leaf zone is controlled to be high in CO2 while the root zone Z-2 is isolated and provided with ambient or higher O2, at a pressure to prevent infiltration of CO2 from zone Z-1. The differential atmosphere in each zone can be selectively monitored and adjusted to provide improved growing conditions. The inventive plant environment control system and method is particularly useful in the field of hydroponic and aeroponic growing enclosures, wherein nutrients are periodically provided to the roots, and a high CO2 atmosphere, plus heat and light of appropriate growth-enhancing wavelengths, are provided to the leaves for forced, high-yield growth of selected plants indoors, regardless of the season.

15 Claims, 5 Drawing Sheets

(56) References Cited

U.S. PATENT DOCUMENTS

| | | | |
|---|---|---|---|
| 2006/0168882 A1 | 8/2006 | Hashimoto et al. | |
| 2009/0313894 A1 | 12/2009 | Bieber | |
| 2011/0023359 A1* | 2/2011 | Raring | A01G 31/02 47/62 A |
| 2012/0005957 A1 | 1/2012 | Downs, Sr. | |
| 2012/0324789 A1 | 12/2012 | Pease et al. | |
| 2013/0019527 A1 | 1/2013 | Howe-Sylvain | |
| 2013/0185998 A1* | 7/2013 | Wilson | A01G 31/00 47/59 R |
| 2014/0144078 A1* | 5/2014 | Gonyer | A01G 31/02 47/62 A |
| 2014/0190078 A1* | 7/2014 | Kim | A01G 31/02 47/62 A |
| 2014/0318012 A1* | 10/2014 | Fujiyama | F24F 11/0001 47/62 R |
| 2015/0282444 A1* | 10/2015 | Butler | A01G 31/02 47/62 C |
| 2016/0000021 A1* | 1/2016 | Sugimoto | A01G 1/001 47/66.6 |

* cited by examiner

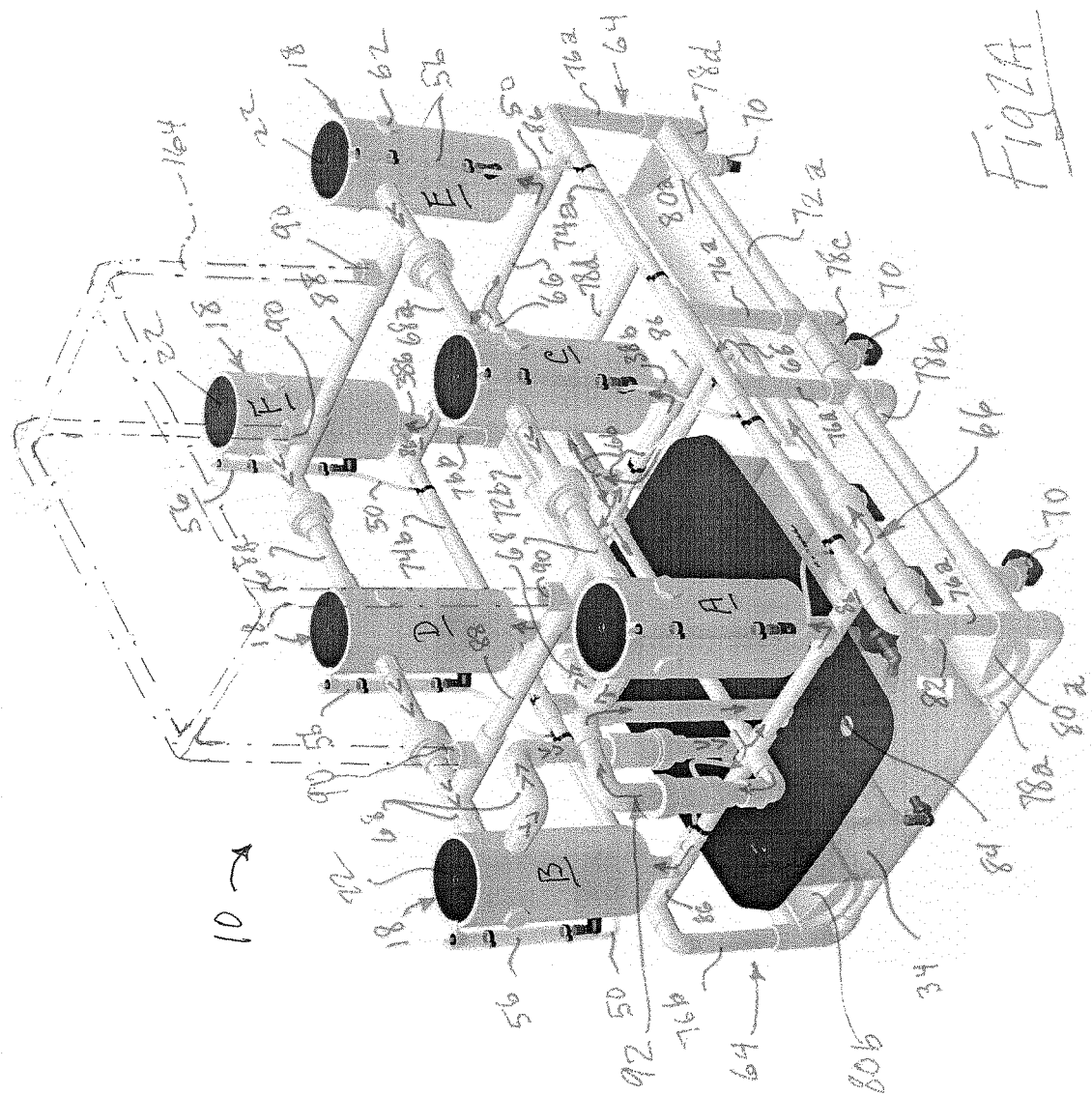

ROOT ENVIRONMENT CONTROL SYSTEM AND METHOD

FIELD OF THE INVENTION

The invention is directed to an apparatus and method for control of the atmosphere in a stem/leaf zone of a plant that is different from the atmosphere in a root zone of a plant, and more particularly to prevent infiltration of $CO_2$, provided in the stem/leaf zone of a plant to enhance growth and production, into the root zone, which is maintained at a positive pressure of ambient air or an enhanced $O_2$ content. The inventive apparatus provides practical level of isolation of the root zone from the stem/leaf zone so that the method of differential atmosphere control of the gaseous environment in each zone can be selectively monitored and adjusted to provide improved growing conditions. The inventive plant environment control system and method is particularly useful in the field of hydroponic and aeroponic growing enclosures, wherein nutrients are periodically provided to the roots, and a high $CO_2$ atmosphere, plus heat and light of appropriate growth-enhancing wavelengths, are provided to the leaves for forced, high-yield growth of selected plants indoors, regardless of the season.

BACKGROUND

A conventional technique to accelerate and enhance plant growth indoors is to place the plant in a growth enclosure in which the leaves of the plant are exposed to a warm, often humid atmosphere that has an enhanced $CO_2$ content, typically on the order of from about 1000 ppm to 1500 ppm $CO_2$. The plants are also irradiated with grow lamps having a spectral output selected for the particular plant species. The leaves process the $CO_2$ and produce $O_2$. The leaf zone is continuously monitored and additional $CO_2$ is introduced to maintain the desired excess $CO_2$ level. Of course, there are typically vent systems to permit exchanges of the atmosphere to keep the $O_2$ level from building up. Such enclosures typically operate at a positive $CO_2$ pressure in the leaf zone.

However, +$CO_2$ pressurized systems suffer from the problem of infiltration of $CO_2$ into the root zone. This is exacerbated by hydroponic or aeroponic systems in which nutrient fluid is periodically introduced into a root container, and thereafter flushed. The flushing produces a vacuum effect which draws in $CO_2$ from the leaf zone in cases of $CO_2$-overpressure systems. The result is to effectively "poison" the root zone, as roots require $O_2$ for best growth and health.

To overcome this problem it has been proposed to oxygenate the water or water-based nutrient solutions that are provided to the root zone. While this may provide some help, since best practices in this field are to only periodically replenish (or flood) and flush the root container with nutrient solutions, such periodic flood/flush cycle leaves the vast majority of the plant growth period with roots exposed to the infiltrating $CO_2$ from the overpressure $CO_2$ leaf zone above.

Accordingly, there is a long-felt, but unmet need in this field for an apparatus system and method for maintaining the root zone at all times with normal or above $O_2$ content, preferably at an overpressure, and to isolate the leaf zone from the root zone, preferably at the plant's crown structure where the stem transitions into roots, in order to prevent infiltration of $CO_2$ from the overpressure leaf zone into the root zone.

THE INVENTION

Summary of the Invention

The invention is directed to an apparatus system and method of enhancing and controlling plant growth to improve yield and harvest quality, comprising apparatus for isolating and maintaining differential atmospheric control with respect to $CO_2$ and $O_2$ gases in a first, stem/leaf zone, Z-1, of a plant from a second, root zone, Z-2, of the plant. The inventive system and method may be applied to a single-plant root-container module or to an array of multiple modules having common nutrient source and air/$CO_2$ source feeding each module in the array via suitable manifolds and control system(s).

More particularly, the inventive system and method provides for control of the atmosphere in a stem/leaf zone of a plant that is isolated and different from the atmosphere in a root zone of a plant. The inventive system and method is particularly suited to $CO_2$-type forced-growth systems wherein $CO_2$ is introduced into an enclosure containing the plants to provide a high $CO_2$ atmosphere to accelerate plant growth and improved production. In the inventive system, isolation is provided by a $CO_2$-impervious membrane disposed at the root/stem juncture of a root container to prevent infiltration of $CO_2$ into the root zone of the container. In addition the isolated root zone is maintained at a positive pressure of ambient air/$O_2$ so that infiltration into the root zone by the over-concentration of $CO_2$ in the leaf zone is minimized or prevented entirely.

The inventive system provides practical level of isolation of the two zones from each other so that the method of differential atmosphere control of the gaseous environment in each zone can be selectively monitored and adjusted to provide improved growing conditions. The inventive plant environment control system and method is particularly useful in the field of hydroponic and aeroponic growing enclosures, wherein nutrients are periodically provided to the roots, and a high $CO_2$ atmosphere, plus heat and light of appropriate growth-enhancing wavelengths, are provided to the leaves for forced, high-yield growth of selected plants indoors, regardless of the season.

The inventive system is particularly suited to growth of plants indoors in an enclosure which is provided in order to control the leaf zone, Z-1, with an over-pressure or over-concentration of $CO_2$ (as compared to ambient atmosphere) in order to enhance growth. The enclosure is provided with conventional lighting and heating systems, and optionally with a humidification system, all of which include controls for the temperature, be it continuous or cyclical, and for the lighting, in order to provide the appropriate photo-periodicity for the type of plant and the level of forced-growing selected. Similarly, the humidity may be controlled at selectively adjustable steady-state or varied on a periodic cycle. The enclosure is provided with auxiliary source of $CO_2$, such as a cylinder of $CO_2$ that may be bled into the enclosure atmosphere in a slow continuous stream, or may be monitored and periodically introduced, typically controlled by a $CO_2$ sensor that has settable upper and lower limits which trigger solenoids to selectively open and close the $CO_2$ supply tank valve as the limit switches are triggered. The enclosure is typically sufficiently sealed from the external ambient environment to provide a pre-selected over-pressure/over-concentration of $CO_2$, so that opening and closing access doors do not produce net upsets of the $CO_2$ levels.

A multiplex system embodiment of the invention comprises a suitable framework in which a plurality of root containers are arrayed. The framework may be fitted with wheels to provide mobility in moving or repositioning a group of plants within a growing facility, as needed. The root containers comprise a root chamber, typically a round section of plastic tube, e.g. 6-24" in diameter, disposed with its central axis in a vertical orientation. The lower end of the root chamber tube is closed by a wall or cap. A CO2-impermeable cap, such as a vinyl or neoprene cap or membrane, effectively seals the top of the tube from the remainder of the enclosure, forming an isolated root zone, Z-2, essentially defined by the volume of the root chamber. A suitable root support medium is introduced into the root zone, Z-2 (before emplacement of the CO2-impermeable cap member), such as gravel, rock wool, lava rock, zeolite, cocos fiber, or other conventional hydroponic/aeroponic rooting medium. The cap is slit, typically radially from a central point so that the stem of a plant can project up into the upper stem/leaf zone, Z-1, while the roots remain below in the root zone, Z-2. The cap/membrane material is flexible and the slits permit stem enlargement without girdling and killing the plant, yet effectively sealing off the root zone, Z-2 from the stem/leaf zone, Z-2.

The root chamber is also provided with a tubular riser coming up through the bottom wall, having a series of apertures along its length and open at the top. This riser functions as a nutrient solution manifold for the periodic introduction of nutrient solution from a nutrient reservoir via a pump. An overflow tube is provided adjacent the upper end of the root chamber at a level selected to be below the underside of the CO2 seal and approximately at the root crown level. However, the exact level of placement is selected depending on the requirements of the plants being grown, and may be lower or higher as needed. The overflow tube returns excess nutrient to the nutrient reservoir, or to external drain. For cyclic supply and flush systems, the riser also functions as a drain upon reversal of the supply pump. Alternately, a separate, valve-controlled drain line may be provided in the bottom wall or cap of the root chamber. The pump, and a master supply of nutrient are electrically connected to a nutrient supply controller which may be programmed to selectively supply, or cyclic supply and flush, of nutrient in coordination with a photo-period lighting controller.

An air or O2 delivery line is also provided to the root chamber, in one embodiment in the form of a tube leading from an air or O2 supply through the side wall of the root chamber adjacent the bottom end wall. A sparger is disposed internal of the root chamber in communication with the air/O2 delivery line. An exemplary sparger is a tubular ring having small holes permitting the formation of small bubbles or jets of air/O2 into the root chamber. The air supply may be external of the enclosure, or enclosure building, or a source of O2 may be fed into ambient air to enrich it before being introduced into the root zone, Z-2. The volume and rate of air/O2 supply is monitored and adjusted to provide an overpressure of air/O2 in the root zone at a level sufficient to prevent infiltration of CO2 into the root zone, Z-2 from the over-pressure or over-concentration of CO2 in the stem/leaf zone, Z-1. Even though the radial slits in the stem seal may not completely seal the stem from the root zone, Z-2, the overpressure of air/O2 coming up from the manifold inletting into the root chamber prevents the infiltration of CO2, not only when flushing the root chamber of nutrient solution, but also when there is no nutrient solution being cycled into the root chamber and the roots are relatively exposed in the damp rock wool or other root support medium.

Accordingly, the inventive system provides differential control of the atmospheres in the two zones, high CO2 in zone Z-1, and above-normal ambient atmospheric O2 content in the root zone Z-2. In addition, careful control of the differential pressures in the zones prevents infiltration of CO2 into the root zone and the potential for root poisoning as a consequence.

BRIEF DESCRIPTION OF THE DRAWINGS

The invention is described in detail with reference to the drawings, in which:

FIG. 2A is an elevated isometric view, looking down from the front right corner, showing an array of six modules of FIGS. 1A and 1B in a mobile framework with a common nutrient solution supply via a distribution manifold and a corresponding air/O2 supply manifold for the root zones, and having a common control system;

DETAILED DESCRIPTION, INCLUDING THE BEST MODES OF CARRYING OUT THE INVENTION

The following detailed description illustrates the invention by way of example, not by way of limitation of the scope, principles of the invention. This description will clearly enable one skilled in the art to make and use the invention, and describes several embodiments, adaptations, variations, alternatives and uses of the invention. In the following, the description of the invention is shown as used in hydroponic or aeroponic forced growing enclosures.

Figure 1A:
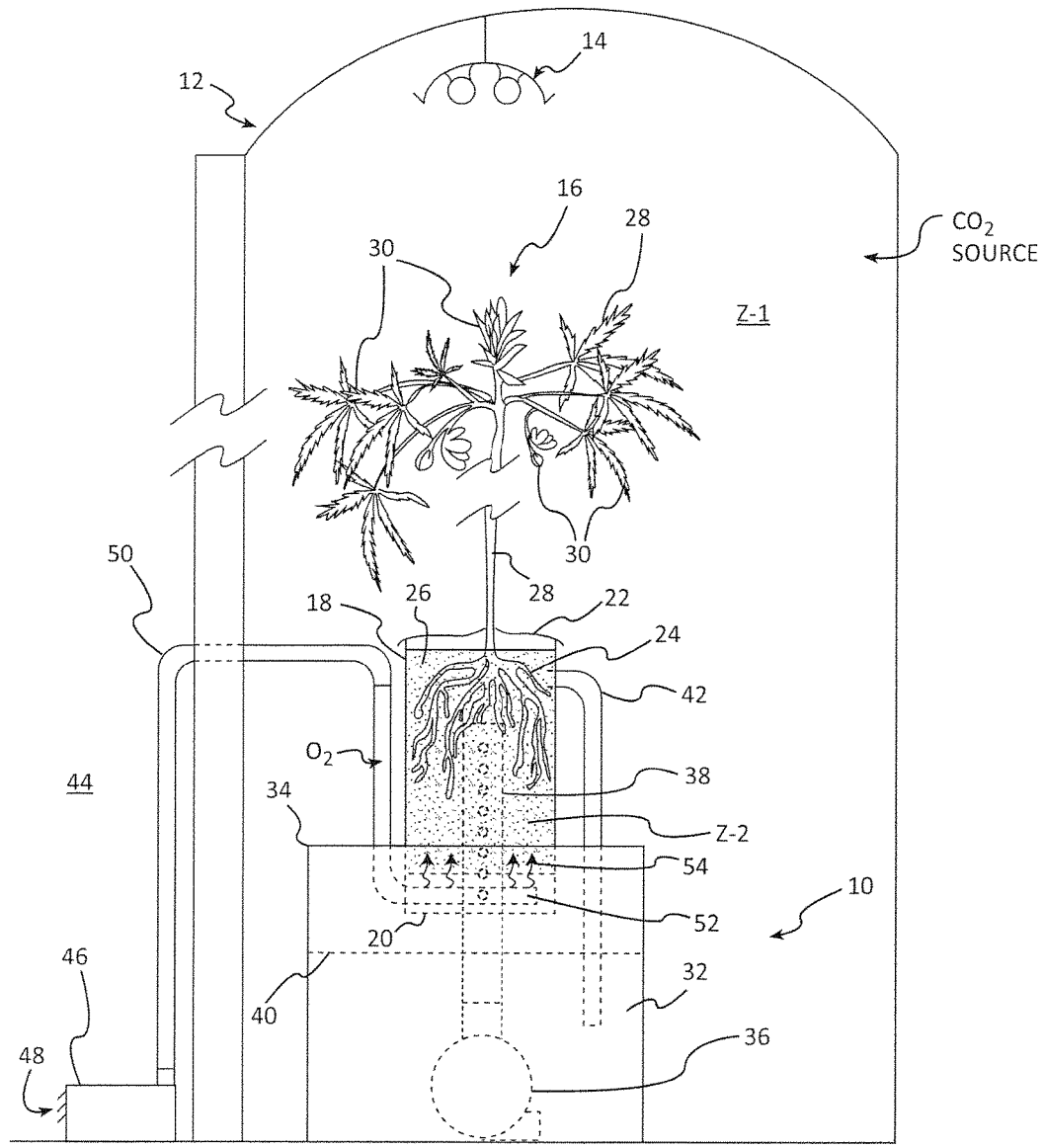
FIG. 1A is an illustration of one embodiment of the present invention, primarily schematic yet partly in section, showing a single module of the inventive apparatus disposed in a growth enclosure, comprising a growth medium chamber defining a root zone separated from the stem/leaf zone and including both a nutrient solution supply and drain system and an air/O2 supply for maintaining the root zone oxygenated.

As shown in FIG. 1A, the inventive differential atmosphere control system 10 is shown disposed in an enclosure 12 providing for enhanced (super-atmospheric) CO2 content, and having suitable light and heat source(s) 14. One unit is shown by way of example, but one skilled in the art will recognize that a plurality of units will be disposed in an efficiently organized array within the enclosure 12. A plant 16 is retained in a root chamber 18, shown by way of example as a plastic tube, having a bottom wall or cap 20 and an upper stem seal 22. The roots 24 of the plant are retained and grow in a rooting medium 26, shown here by way of example as rock wool. The stem and leaves of the plant 28 project up through slits formed in the neoprene seal. A suitable slit configuration comprises a plurality of slits radiating out from the center point of the seal in triangular segments. This permits the tips of the segments to project up the stem of the plant and to open as the stem increases in diameter during plant growth. Shown schematically are fruits, leaves, flowers or buds, 30, of the plant to represent the plant material that is to be harvested at the appropriate stage of the growing cycle.

A nutrient solution 32 is provided from a reservoir 34 via a pump 36 to a manifold (piping system) that terminates in a riser tube 38 disposed in the root chamber 18, being inlet into the chamber via an aperture in the bottom wall or cap 20. As shown by way of example, the riser tube has a plurality of holes in the side wall and terminates short of the top of the root chamber. The nutrient solution level 40 in the tank 34 is maintained at a pre-determined level suitable for the growing needs of the particular plants being grown and the rate of supply to them. The pump assembly typically includes a programmable timer to provide flow of nutrient from the tank to the root chamber. The upper level of nutrient in the chamber may be controlled by use of an overflow tube 42 which returns excess nutrient back to the reservoir 34, or to an external drain (not shown). For a cyclic flood and flush system, deactivation of the pump (turning it OFF) permits nutrient to drain by gravity back into the tank via the riser. Alternately, the pump may be reversed to withdraw nutrient back to the tank via the manifold riser 38. A conventional float-triggered solenoid may be used in the tank to provide, as needed, input of fresh nutrient from an external source (not shown).

Separate from the elevated $CO_2$ zone, Z-1 inside the enclosure 12 is the ambient atmosphere 44. An air pump 46, having an ambient atmosphere inlet 48 for drawing in air and passing it into the root chamber via tubular air delivery manifold 50. As shown, supplemental source of $O_2$ may be inlet into the delivery manifold 50. The air/$O_2$ manifold terminates interior of the root chamber 18 in a delivery tube or nozzle, shown by way of example as a sparger 52 which releases streamlets (when nutrient solution is absent) or bubbles (when nutrient solution is present) of air/$O_2$ 54 into the root zone Z-1. This maintains the roots oxygenated. The rate of inflow of air/$O_2$ is set to provide a slight overpressure as compared to the pressure in the stem/leaf zone Z-1. This prevents $CO_2$, which is present in super-atmospheric concentrations in zone Z-1, from infiltrating past any segment separations in the seal 22 into the root zone Z-2. This also provides a constant flow of ambient atmosphere air or supplemental $O_2$ into contact with the roots, enhancing the overall plant development, increasing rate of growth and yield.

Figure 1B:
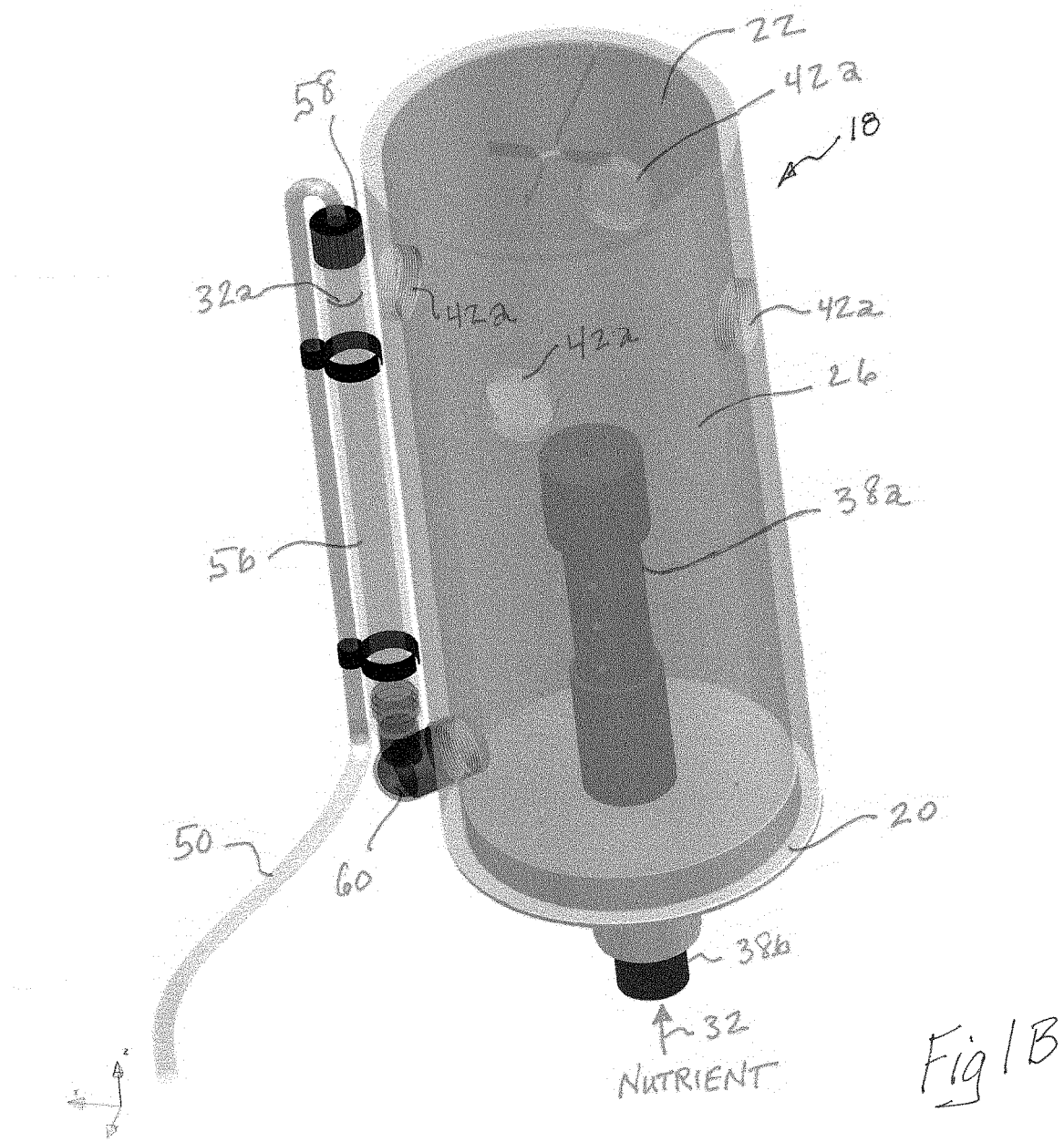
FIG. 1B is an isometric view of an embodiment of the root chamber, including a sight glass for determining the nutrient level and for in-feed of oxygen.

FIG. 1B shows an enlarged view of an exemplary root chamber 18 comprising a cylindrical chamber, closed at the bottom by a wall or cap 20, and including an axially disposed in-feed riser 38a, 38b for supply of nutrient 32 to the rooting medium (not shown). The nutrient level in chamber 18 is controlled by the vertical height location of one or more outlet apertures 42a, which connect to the overflow manifold 42 (see FIGS. 1A, 2A and 2B). In this embodiment, four apertures 42a are provided in an orthogonal arrangement to permit flexibility in constructing arrays of any desired number of root chambers. Unused apertures are closed by plugs 62 (see FIGS. 2A, 2B). A sight glass assembly 56 is provided adjacent the root chamber as shown. The sight glass assembly includes an upper seal cap 58 through which the oxygen/air supply tube 50 is threaded into the nutrient in the sight glass, and a connector elbow 60 at the bottom through which the sight glass connects to the root chamber 18. The nutrient fluid level 32a in the chamber 18 is visible in the sight glass. The oxygen/air is fed into the top of the sight glass so that nutrient does not enter the tube 50. The optional sparger 52 is not shown in this figure.

FIG. 2A is an isometric view, partially in schematic, of an array of six root chambers 18, identified as A-F, secured in a mobile framework 64 as an example of a commercial multiplex unit. Each of the six root containers A-F is supplied with nutrient via feed and drain manifold systems 66, 68, respectively, fed from and draining back to a common nutrient supply tank 34 carried in the mobile framework. In addition an air/$O_2$ manifold 50 supplies each of the root zones A-F with the air/$O_2$. Quick connect/disconnect fittings may be used on the nutrient and air/$O_2$ flex hoses, or they may be hard-line plumbed within each of the frameworks. The framework of this embodiment is mounted on wheels (casters) 70 so that the array assembly may be easily moved or repositioned within a facility as needed.

The exemplary framework 64 is constructed of 2" PVC pipes (e.g., Schedule 40), and comprises lower longitudinal side frame members 72a (right side), 72b (left side) above which are disposed upper longitudinal side frame members 74a (right side), 74b (left side) supported by a plurality of vertical spacers 76a (right side), 76b (left side), four on each side being shown. Together, the upper and lower longitudinal frame members 72, 74 and verticals 76 define respective right and left side wall planes. A plurality of lower cross members 78a, 78b, 78c, 78d join the lower right and left longitudinal side frame members, the length of the lower cross members defining the spacing-apart of the respective side walls. The reservoir 34 is supported on the cross bars 78a, 78b. A pair of optional longitudinal drip trays 80a, 80b disposed below the two rows of root chambers, A-C-E and B-D-F, respectively, parallel to the side walls and supported by the cross members may be provided to catch any stray drips from the root chambers.

The nutrient feed manifold system 66 serves to space and brace the upper longitudinal side frame members 74a, 74b, as well as support the root chambers 18, A-F, on their respective risers 38b. The riser segment 38b connects to the cross members of the feed manifold external of the root chamber and communicates with the riser segment 38a internal of the root chamber (see FIG. 1B). As seen in both FIGS. 2A and 2B, the arrows → on the feed manifold 66 show the direction of flow of nutrient out of the tank 34 into the riser segments 38b, and thence into the respective root chambers 18, A-F. The arrows << show the drain flow out of the root chambers A-F back to the nutrient tank 34 via the drain manifold system 68. In the array illustrated, draining is from E,F to C, D, then to A, B and back to the reservoir 34. A drain and flush cap 82 is provided to drain all nutrient from the feed manifold 66 and the root chambers A-F. Feed level control loop 92 is provided to prevent overfill of the root chambers, that is, so that pumping nutrient longer than needed or programmed will not cause nutrient to flow out the top of the chambers through the slits of the stem seal 22, but rather will flow up through the loop and back down to the reservoir 34.

The reservoir may be filled through top opening 84. Segments 86, lying between the riser portions 38b and the side wall members 74a, 74b are blocked so that nutrient does not leak into the framework piping. Likewise the upper spacer sections 88 between the longitudinal drain manifold lines are blocked to prevent cross flow. These upper spacers also function to rigidify the upper end of the root chambers. In addition they may include a number of T-segments 90, oriented with the stem upward, so that an additional pipe framework 164 may be added from which grow-lamps 14 may be supported. The function of the sight glass 56 and air/oxygen input via manifold lines 50 has been described above with respect to FIG. 1B.

Figure 2B:
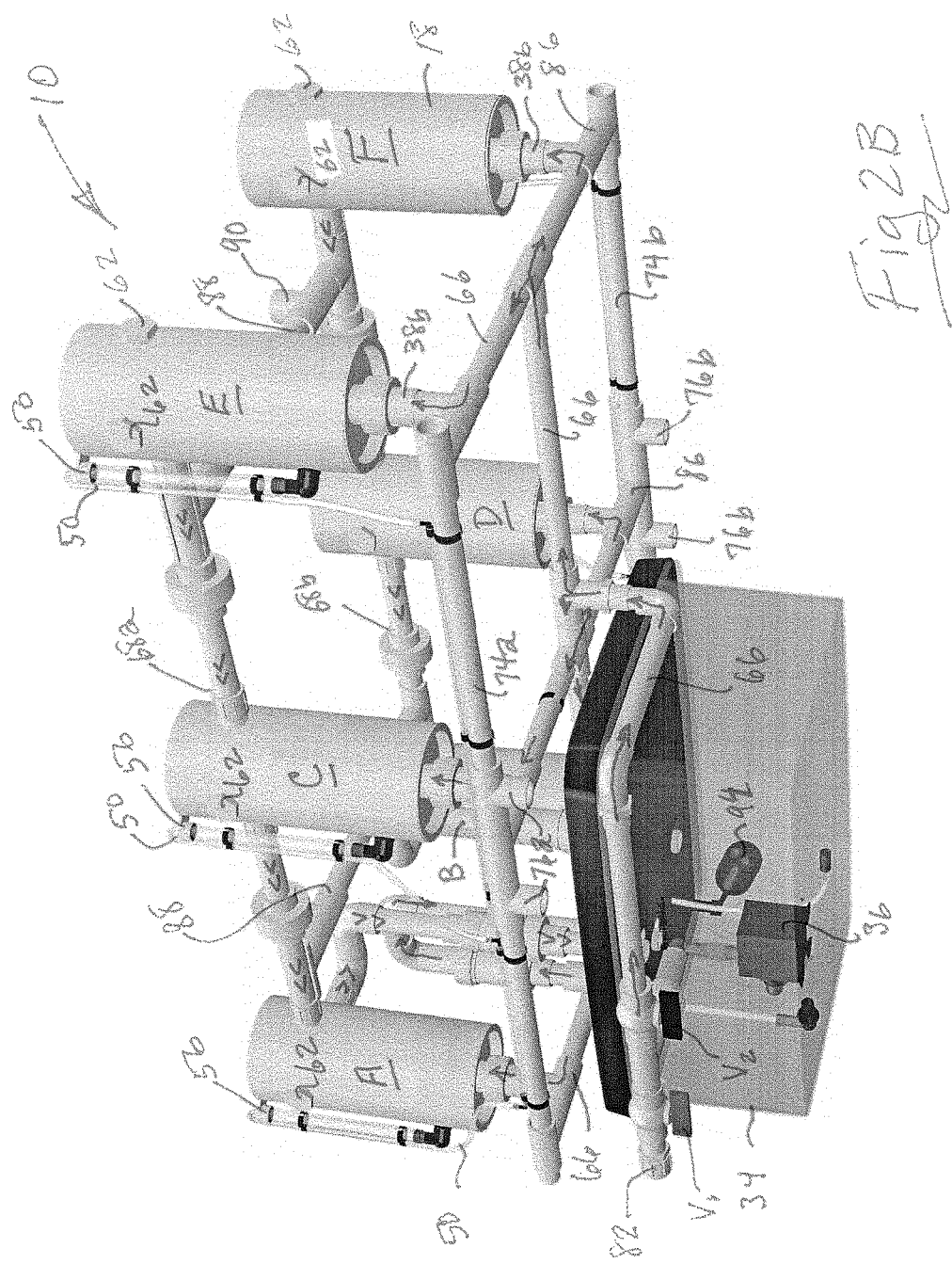
FIG. 2B is a lower isometric view, looking up from the left rear corner, showing the array of six modules of FIGS. 1A and 1B to more clearly illustrate the nutrient feed and drain manifolds without the mobile framework.

FIG. 2B is an isometric view showing the manifold systems 66, 68 connected to the nutrient tank 34 and each of the root chambers 18, A-F, in which the inventive array has been rotated from that in FIG. 2A to a view from below to complete the understanding of the manifold system piping and the fluid flow. The lower framework has been deleted in this view. The parts numbering is the same as in FIG. 2A and the fluid flow convention of → and << is the same. The pump 36, and ON/OFF float sensor 94 are visibile in the nutrient tank 34. To gravity drain the feed manifold 66 and the chambers A-F, the pump 36 is shut off, the cap 82 is removed, and both valves V1 and V2 are opened. For power draining of the reservoir 34, the pump 36 is powered ON, drain cap 82 is removed, Valve V1 is OPEN and Valve V2 is CLOSED. Liquid will then be pumped out of the reservoir without refilling the root chambers. The reservoir may be filled through 82 by closing valve V2 while V1 is opened. In operation, V1 is NC and V2 is NO.

Figure 3:
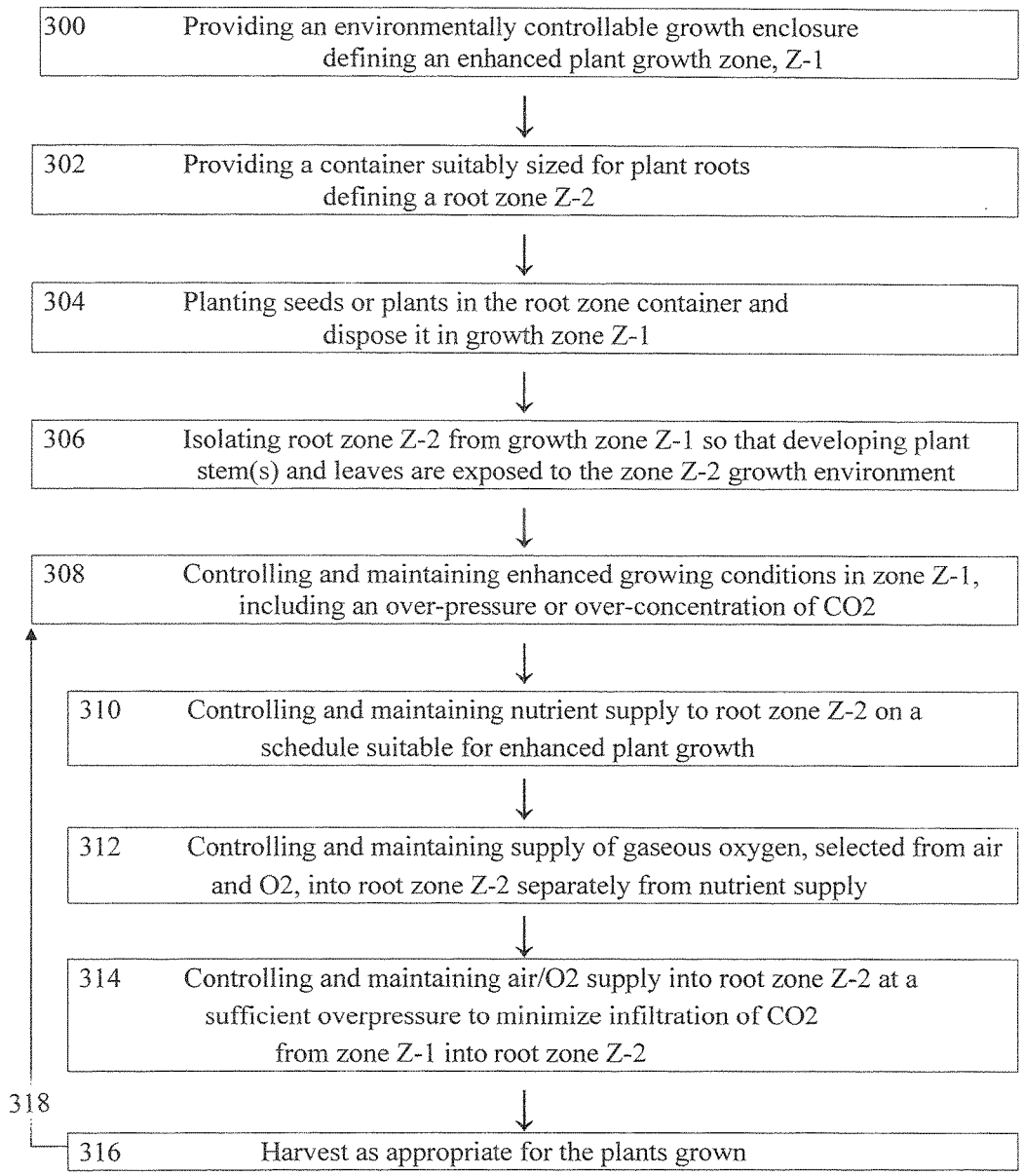
FIG. 3 is a flow sheet of the improved plant propagation method.

FIG. 3 is a flow sheet of the method of plant propagation in accord with the invention. At step 300, an environmentally controllable growth enclosure, see enclosure 12 in FIG. 1, is provided, and which defines an enhanced plant growth zone, Z-1. At step 302, at least one container, see 18 in FIG. 1, is provided in which plant is to be grown. The container is sized for the root system of a plant emplaced in a rooting medium installed within the container, and this assembly defines a root zone, Z-2. In step 304, either seeds, shoots, seedlings or started or established plants are planted in the rooting medium. Where a seed or seedling is emplanted in the rooting medium, there may be a delay in installing the isolation cover membrane, see membrane 22 in FIG. 1 to permit shoots to have ready access to the enhanced CO2 concentration of the growth zone, Z-1.

At the appropriate time, step 306 follows by isolating the root zone Z-2 from the growth zone Z-1 by emplacing the isolation membrane 22 over the open top of the rooting container 18, and pulling the stem and leaves through the slits so that they are exposed to enhanced CO2 of the Z-1 growth environment zone. In step 308, the enhanced growing conditions in zone Z-1, including heat, light, humidity and the enhanced CO2 concentration are maintained and controlled to force growth of the selected plants. Simultaneously at step 310, the aqueous nutrient supply to the roots in root zone Z-2 is maintained at a balanced nutrient mix and controlled on a schedule suitable for enhanced plant growth. Likewise, simultaneously at step 312, the supply of gaseous oxygen, supplied as air, O2 or O2-supplemented air, is maintained at a quantity and controlled at a rate to provide oxygenation of the root zone.

Although simultaneous, the supply of gaseous oxygen is separate from the nutrient supply; that is, the air or O2 is not dissolved into the nutrient, e.g., in a nutrient supply tank, but rather is provided by a separate feed directly into the root zone Z-2. This gaseous oxygen feed may be humidified to prevent drying of the roots during periods when the nutrient level in the root zone container 18 is below some or all of the roots, e.g., during the flush of a flood-and-flush nutrient supply cycle. At step 313, the gaseous oxygen introduced into the root zone is supplied at a sufficient over-pressure to minimize or eliminate infiltration of CO2 from the leaf zone Z-1 into the root zone Z-2. The pressures may be essentially balanced in the two zones, or there may be a slight excess of pressure in the root zone Z-2 as compared to the leaf zone Z-1. Thus, any gaps that may be produced by the enlarging plant stem during growth are prevented from serving as access points for CO2 to infiltrate the roots, slowing or stopping their growth. The unexpected result of the differential zone control of this invention is enhanced plant growth and production.

At the appropriate growth maturity of the plant, the selected plant tissue is harvested, e.g., fruit, seed or leaves, at step 316. This harvesting may be periodic, e.g., leaves or fruit, and the process continues from step 316 back to step 308, as shown by the recycle loop 318.

INDUSTRIAL APPLICABILITY

It is clear that the inventive differential atmosphere system in the separate zones, the leaf/stem zone, Z-1 as compared to the root zone, Z-2 provides total control, not only of the root and leaf nutrients, but also of the atmospheres best suited to plant health, growth, development and yield. Heretofore, only the root nutrients and leaf atmosphere have been controlled. What has been overlooked is the atmosphere requirements of roots, which is the opposite of the leaves. Accordingly, zone isolation and prevention of infiltration of CO2 from the stem/leaf zone into the root zone of this invention, considered as both an apparatus system and method, have the clear potential of becoming adopted as the new standard for apparatus and methods of hydroponic and aeroponic plant propagation.

It should be understood that various modifications within the scope of this invention can be made by one of ordinary skill in the art without departing from the spirit thereof and without undue experimentation. For example, the root chamber can have a wide range of designs to provide the functionalities disclosed herein, such as being elongated troughs for bedding multiple plants. Likewise, multiple root chamber assemblies may be arrayed in a wide variety of configurations, and a single nutrient reservoir may feed multiple root chambers. The chamber seal may employ a wide range of materials other than neoprene, and the stem opening may be configured in any suitable design, This invention is therefore to be defined by the scope of the appended claims as broadly as the prior art will permit, and in view of the specification if need be, including a full range of current and future equivalents thereof Parts List (This Parts List is provided as an aid to Examination and may be canceled upon allowance)

| | |
|---|---|
| 10 | Inventive Zoned Atmosphere Control System |
| 12 | Plant growth enclosure |
| 14 | Light and heat source(s) |
| 16 | Plant |
| 18 | Root chamber |
| 20 | Bottom wall or cap |
| 22 | Neoprene (or equivalent) stem seal assembly |
| 24 | Roots supported in rooting medium |
| 26 | Rooting medium, e.g., rocks or rock wool |
| 28 | Stem/leaves of plant |
| 30 | Harvest product (fruit, flowers, fruit, buds, etc) |
| 32 | Nutrient solution |
| 34 | Nutrient reservoir |
| 36 | Pump (may include level sensors & timer) |
| 38 | Nutrient feed riser in root chamber |
| 40 | Nutrient level in reservoir |
| 42 | Nutrient overflow manifold |
| 42a | Caps |
| 44 | Ambient atmosphere (source of O2) |
| 46 | Air pump |
| 48 | Ambient air inlet to air pump |
| 50 | Air delivery manifold (piping) |
| 52 | Air sparger in root chamber |
| 54 | Air/O2 streamlet or bubbles into root zone, Z-2 |

-continued

Parts List (This Parts List is provided as an aid to Examination and may be canceled upon allowance)

| | |
|---|---|
| 56 | Sight glass for root chamber |
| 58 | Sight glass seal plug |
| 60 | Sight glass connector elbow |
| 62 | Aperture plugs |
| 64 | Mobile framework |
| 66 | Nutrient manifold system |
| 68 | Drain manifold system |
| 70 | Casters |
| 72 | Lower frame |
| 74 | Upper frame |
| 76 | Vertical spacers |
| 78 | Cross bars |
| 80 | Drip trays |
| 82 | Drain flush cap |
| 84 | Fill cap |
| 86 | Blocked/sealed segments |
| 88 | Upper spacer section |
| 90 | T-section |
| 92 | Loop |
| 94 | Float senser |
| 164 | Framework for suspending grow lamps 14 |
| Z-1 | Enhanced CO2 Environment, 1000-1500 ppm CO2 |
| Z-2 | Root O2 Environment, 0-300 ppm O2 |
| O2 | Supplemental Oxygen Source for Z-2 |
| CO2 | CO2 Source for Z-1 |
| A-F | Root Chambers |
| → | Nutrient Flow |
| << | Overflow drain |
| V1, V2 | Valves |

The invention claimed is:

1. A plant propagation apparatus for control of atmosphere requirements of roots of plants having at least one plant root system disposed in a root zone Z-2 connected to at least one stem supporting leaves disposed in a separate zone Z-1 for enhanced growth of said plants in an enhanced CO2 atmosphere enclosure said apparatus preventing infiltration of CO2 from zone Z-1 into root zone Z-2 by the combination of a CO2 impervious sealing membrane and maintaining positive pressure of O2 in said zone Z-1, comprising:

a) means for retaining said plant root system in said (a) plant root zone Z-2 comprising a cylindrical container having a top and bottom and including a sight glass tube connected adjacent said container bottom, said sight glass tube configured to provide an indication of a level of nutrient solution in said means for retaining said plant root system;

b) rooting media for support of plant roots disposed in root zone Z-2, said media having a property of maintaining said plant roots moist;

c) an aqueous nutrient supply system connected to said means for retaining said plant root system configured to supply aqueous nutrient solution to roots of a plant in said rooting medium in fill and flush cycles, disposed to introduce nutrient solution adjacent the bottom of said means for retaining said plant root system in said root zone Z-2 said media maintaining said plant root system moist during flush portions of said nutrient supply;

d) a separate gaseous oxygen-overpressure supply system connected to said means for retaining said plant root system in said plant root zone Z-2 configured to supply an overpressure of gaseous oxygen selected from air, O2 and O2-supplemented air to roots of a plant in said rooting medium in said root zone Z-2, and said gas supply introduces oxygenated gas adjacent the bottom of said root zone Z-2 via said sight glass tube, said container having no gaseous oxygen exhaust and said rooting media having a property of porosity that permits O2 to permeate to plant roots retained in said media;

e) a CO2-imperveous, flexible vinyl or neoprene sealing membrane disposed in association with said means for retaining said plant root system and disposed above said rooting medium at the top of said plant root retaining cylindrical container isolating said zones Z-1 and Z-2 from each other, said membrane being slit radially from a central point to permit the stem of a plant to project up from zone Z-2 into zone Z-1, said slits permitting stem enlargement without girdling yet effectively sealing off the root zone Z-2 from the stem/leaf zone Z-1;

f) said sealing membrane in combination with said gaseous oxygen overpressure supply system produces differential control of atmospheres in said zones by substantially gases-isolating the stem and leaves of said plant in said zone Z-1, from said plant root zone Z-2, said membrane maintaining differential atmospheres of high CO2 in zone Z-1 and an overpressure of oxygen in zone Z-2 relative to the pressure of CO2 in zone Z-1 and said gaseous oxygen overpressure supply system prevents infiltration of CO2 from stem/leaf zone Z-1 into the root zone Z-2 to prevent root poisoning by said CO2 from said zone Z-1;

g) at least one controller for preselected control of: i) an amount of nutrient solution supplied to said root zone Z-2; ii) a rate of supply of said nutrient solution to said root zone Z-2; iii) a schedule of supply of nutrient solution to said root zone Z-2; iv) an amount of supply of said oxygenated gas to said root zone Z-2 to maintain said oxygen overpressure; v) a rate of supply of said oxygenated gas to said root zone Z-2 to maintain said oxygen overpressure; and vi) said controller including a schedule of supply of said oxygenated gas to said root zone Z-2 to maintain said oxygen overpressure; said controller maintaining a repeating cycle of fill and flush of said plant root system container, and during flush said controller maintaining said oxygenated gas amount of supply and rate of supply sufficient to prevent infiltration of CO2 by negative pressure in said root system container while said roots remain moist in said media during flush portion of said cycle; and h) thereby to improve plant growth and increase plant material harvest yield.

2. A plant propagation apparatus as in claim 1 which includes a reservoir to supply said liquid nutrient and a pump associated with said reservoir to pump liquid nutrient to said plant root zone Z-2 via said nutrient supply.

3. A plant propagation apparatus as in claim 1 which includes a drain connected to said means for retaining said plant root system to drain excess nutrient solution from said root zone Z-2.

4. A plant propagation apparatus as in claim 1 wherein said means for retaining said plant root system includes a sight glass assembly disposed to provide an indication of the level of nutrient solution in said means for retaining said plant root system, said sight glass includes an upper seal cap through which a gaseous oxygen supply tube is threaded, said tube terminating above the level of fluid in said sight glass, and said gaseous oxygen is introduced into said root zone via said sight glass assembly.

5. A plant propagation apparatus as in claim 1 in which a plurality of said means for retaining said plant root system are disposed in an array supported on a framework assembly, each said individual means for retaining said plant root system in said array is connected via a liquid manifold system to a common liquid nutrient supply reservoir to supply liquid nutrients to the root zone Z-2 defined in each said means for retaining said plant root system, and each said individual means for retaining said plant root system is connected via a gas supply manifold to a common gaseous oxygen supply to supply an oxygenated gas to said root zone Z-2 defined in each said means for retaining said plant root system.

6. A plant propagation apparatus as in claim 5 wherein said framework includes at least one of: a) wheels disposed so that said framework assembly is mobile; and b) a light support assembly.

7. A plant propagation apparatus as in claim 5 wherein said framework includes a liquid nutrient supply reservoir, a pump associated with said reservoir to pump liquid nutrient to each said plant root zones in said framework via a said liquid supply manifold.

8. A plant propagation apparatus as in claim 7 which includes a drain manifold system connecting each of said individual means for retaining said plant root system in said array to drain excess nutrient solution from said root zones.

9. A plant propagation apparatus as in claim 8 wherein said drain manifold is connected to said nutrient supply reservoir to drain said excess nutrient solution back to said nutrient reservoir.

10. A plant propagation apparatus as in claim 5 wherein each said means for retaining said plant root system includes a sight glass assembly disposed to provide an indication of the level of nutrient solution in said means for retaining said plant root system, said sight glass includes an upper seal cap through which a gaseous oxygen supply tube is threaded, said tube terminating above the level of fluid in said sight glass, and said gaseous oxygen is introduced into said root zone via said sight glass assembly.

11. A method of enhanced plant propagation that improves the rate of plant growth or yield of harvestable plant tissue comprising providing the plant propagation apparatus of claim 1, including the steps of:
 a) providing an environmentally controllable growth enclosure defining an enhanced plant growth zone, Z-1 which includes a higher than ambient CO2 content;
 b) providing a plant container in said growth zone Z-1, said container including a plant rooting medium and having a plant emplanted in said rooting medium defining a root zone, Z-2, containing the roots of said plant, and said plant having a stem and leaves supported by said plant roots projecting above an upper end of said container into said growth zone Z-1;
 c) isolating said plant growth zone Z-1 from said root zone Z-2 so that developing stem(s) and leaves of said plant are exposed to the enhanced CO2 growing environment of zone Z-1;
 d) maintaining enhanced growing conditions in zone Z-1 including supply of CO2 sufficient to provide an amount of CO2 in excess of ambient;
 e) providing a supply of oxygenated gas selected from air, O2-supplemented air and O2, directly into said root zone Z-2;
 f) maintaining the supply of oxygenated gas to said root zone in an amount and for a time sufficient to reduce infiltration of CO2 from said growth zone Z-1 into said root zone Z-2, thereby improving root growth conditions and promoting plant growth to produce improved yield of harvestable plant tissue.

12. Method of enhanced plant propagation as in claim 11 in which said step of maintaining enhanced growing conditions includes preselected control of at least one of: a) the frequency of light for suitable growth of said plant; b) the intensity of light for said plant; c) the duration of exposure of light on said plant; d) the schedule of exposure of said plant to light; and e) the humidity level in said growing enclosure to which said plant is exposed.

13. Method of enhanced plant propagation as in claim 12 which includes controlling the duration of exposure of said plant to said light.

14. Method of enhanced plant propagation as in claim 11 which includes the step of arraying a plurality of plant containers within said growth enclosure.

15. Method of enhanced plant propagation as in claim 14 which includes supplying said nutrient and said oxygenated gas to said plurality of plant containers via separate nutrient supply and gas supply manifolds.

* * * * *